(12) United States Patent
Yehud

(10) Patent No.: US 9,732,890 B2
(45) Date of Patent: Aug. 15, 2017

(54) ARTICULATED CONDUIT DEVICE

(71) Applicant: NOGA ENGINEERING & TECHNOLOGY (2008) LTD., Shlomi (IL)

(72) Inventor: Eitan Yehud, Nahariya (IL)

(73) Assignee: Noga Engineering & Technology (2008) Ltd., Shlomi (IL)

( * ) Notice: Subject to any disclaimer, the term of this patent is extended or adjusted under 35 U.S.C. 154(b) by 311 days.

(21) Appl. No.: 14/658,278

(22) Filed: Mar. 16, 2015

(65) Prior Publication Data
US 2016/0273690 A1 Sep. 22, 2016

(51) Int. Cl.
*F16L 27/08* (2006.01)
*F16L 27/047* (2006.01)
*F16L 27/093* (2006.01)

(52) U.S. Cl.
CPC ......... *F16L 27/0861* (2013.01); *F16L 27/047* (2013.01); *F16L 27/093* (2013.01)

(58) Field of Classification Search
CPC ..... F16L 27/093; F16L 27/0861; F16L 27/04; F16L 27/0841; F16L 27/0804; F16L 27/047
USPC ............. 285/272, 273, 282, 261, 184, 185
See application file for complete search history.

(56) References Cited

U.S. PATENT DOCUMENTS

| 1,894,390 | A | * | 1/1933 | Banks | F16L 27/0861 |
| 2,489,100 | A | * | 11/1949 | Marco | F16L 27/0841 |
| | | | | | 285/184 |
| 4,035,004 | A | | 7/1977 | Hengesbach | |
| 5,275,444 | A | * | 1/1994 | Wythoff | F16L 27/0849 |
| | | | | | 285/185 |
| 5,372,389 | A | | 12/1994 | Tam et al. | |
| 5,383,738 | A | * | 1/1995 | Herbermann | B25J 9/06 |
| | | | | | 285/184 X |
| 8,596,686 | B1 | * | 12/2013 | Desai | F16L 27/0845 |
| | | | | | 285/185 X |
| 8,967,174 | B1 | | 3/2015 | Perreault et al. | |
| 2008/0012305 | A1 | * | 1/2008 | Barker | F16L 27/0861 |
| | | | | | 285/272 |
| 2009/0283382 | A1 | * | 11/2009 | Hedlund | F16L 27/0861 |

OTHER PUBLICATIONS

International Search Report of International Application No. PCT/IL2016/050286 mailed Jul. 10, 2016.

\* cited by examiner

*Primary Examiner* — Gregory Binda
*Assistant Examiner* — Zachary Dragicevich
(74) *Attorney, Agent, or Firm* — Pearl Cohen Zedek Latzer Baratz LLP

(57) ABSTRACT

An articulated conduit device may include at least two arms pivotally connected at proximal ends of the arms by a joint, a tiltable adapter at a distal end of each of the arms, capable of tilting up to a predetermined angle, and a locking mechanism operable by a single action to concurrently lock or unlock the arms and adapters in a user-defined orientation and direction. A continuous cavity is defined within the device between external openings in the adapters and through the arms and joint so as to allow fluid to flow between the external openings of the adapters.

10 Claims, 4 Drawing Sheets

ARTICULATED CONDUIT DEVICE

FIELD OF THE INVENTION

The present invention relates to articulated conduit devices. More specifically, the present invention relates to articulated conduit devices for delivering fluids or liquids.

BACKGROUND OF THE INVENTION

In various machining processes, such as, for example, in computer numeric control (CNC) lathes, milling, chipping, grinding, etc., there is an ongoing need for coolant to be sprayed onto the workpiece and/or on the processing tool (hereinafter also referred to as the "processing spot"), to avoid overheating of and to lubricate the tool or the workpiece.

Various nozzles and hoses for delivering a coolant to a processing spot are known.

In many cases, coolant nozzles are fixed in position and orientation, and are aimed at delivering a coolant to a processing spot located in a known, fixed position.

There are also coolant delivery systems that offer some flexibility, allowing adjusting the direction of coolant jet emerging from the nozzle.

Coolant delivery conduits are rarely designed to withstand high pressures (e.g., of up to 120 atmospheres), which are also common in coolant delivery systems.

SUMMARY OF THE INVENTION

There is thus provided, according to some embodiments of the present invention, an articulated conduit device. The device may include at least two arms pivotally connected at proximal ends of the arms by a joint, a tiltable adapter at a distal end of each of the arms, capable of tilting up to a predetermined angle; and a locking mechanism operable by a single action to concurrently lock or unlock the arms and adapters in a user-defined orientation and direction. A continuous cavity is defined within the device between external openings in the adapters and through the arms and joint so as to allow high-pressure fluid to flow between the external openings of the adapters.

In some embodiments of the present invention, the locking mechanism may include a knob.

According to some embodiments of the invention, the locking mechanism may include movable wedges and spacers, each of the wedges designed to exert a force on one or a plurality of the spaces, when in a locked position, so as to prevent the adapters from tilting, when the joint is locked.

In some embodiments, each of the wedges may include an inclined surface configured to interact with an inclined surface of a spacer of said spacers.

In some embodiments of the invention, each of the spacers may include a passage.

According to some embodiments, each of the adapters may include a spherical member.

In some embodiments, the spacers may each include a funnel facing a bore within the spherical member designed to allow flow even when the spherical member is fully tilted.

In some embodiments, each of the wedges may include a bore through which a shaft is inserted.

According to some embodiments, one of the bores may include an internal thread configured to match a thread on the shaft.

According to some embodiments, the articulated conduit device may be configured to withstand pressures up to 120 atmospheres.

In some embodiments, all or some of the device may be made of hard metal.

In some embodiments, the metal may include stainless steel.

In some embodiments, the adapters may, each, include a spherical member.

In some embodiments, the joint may include two facing caps, each cap coupled to one of the arms.

In some embodiments, the caps may include a ragged edge, the ragged edges facing each other.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

The delivery of high pressure liquid coolant for cooling and lubricating metal forming processes such as high precision machining, creep grinding and high precision grinding has been an important issue within the industry. Various forms and methods of delivering high-pressure liquid coolants are known. Many of these forms and methods provide an incomplete peripheral solution for obtaining an accurate and precise coolant and/or lubricant jet adjustment.

Some embodiments of the present invention are aimed at providing a solution that would allow accurate and precise coolant and/or lubricant jet adjustment. This object and other objects of the present invention are addressed and described hereinafter.

Figure 1:
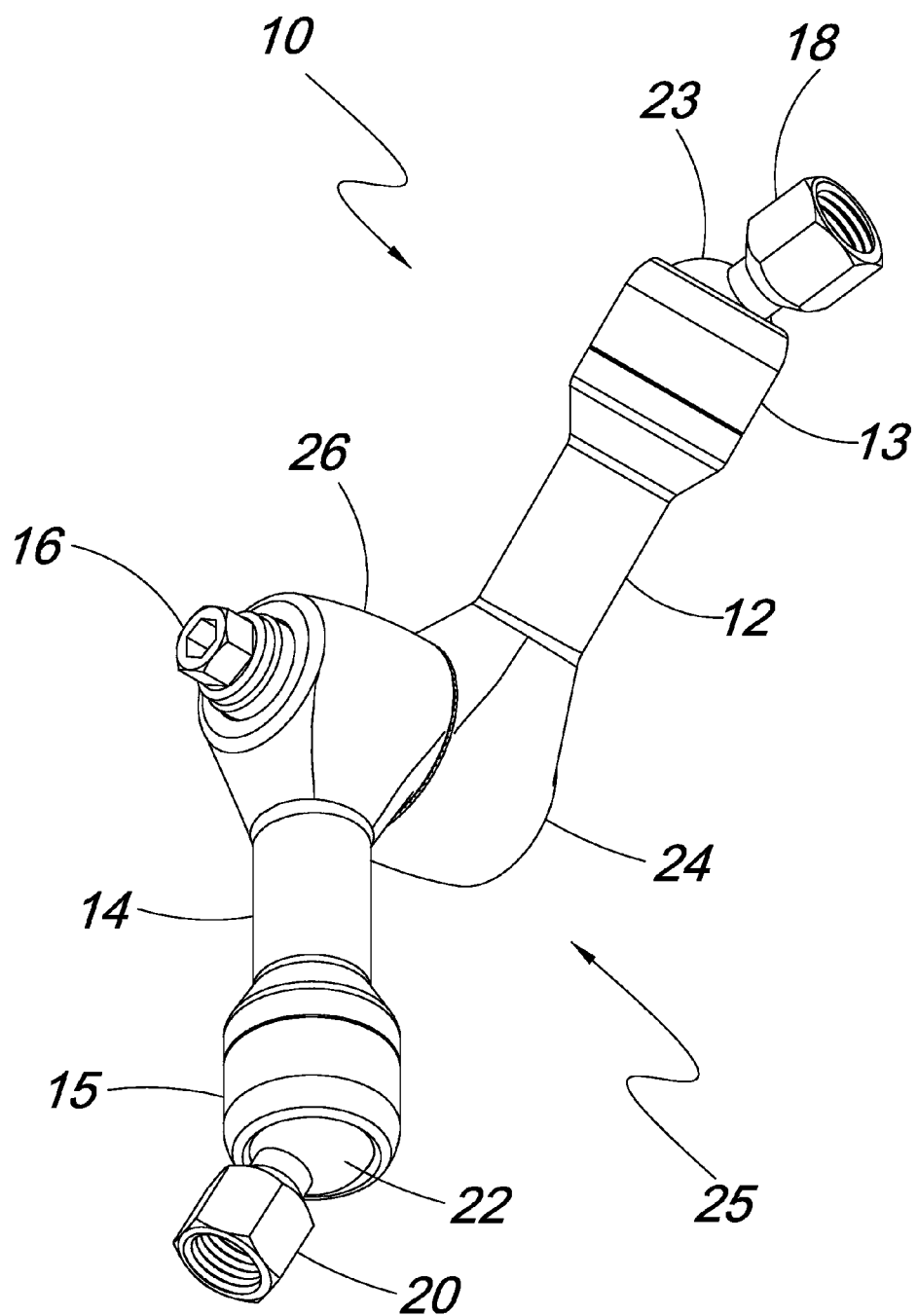
FIG. 1 illustrates an isometric view of an articulated high-pressure conduit device, according to some embodiments of the present invention.
Figure 2:
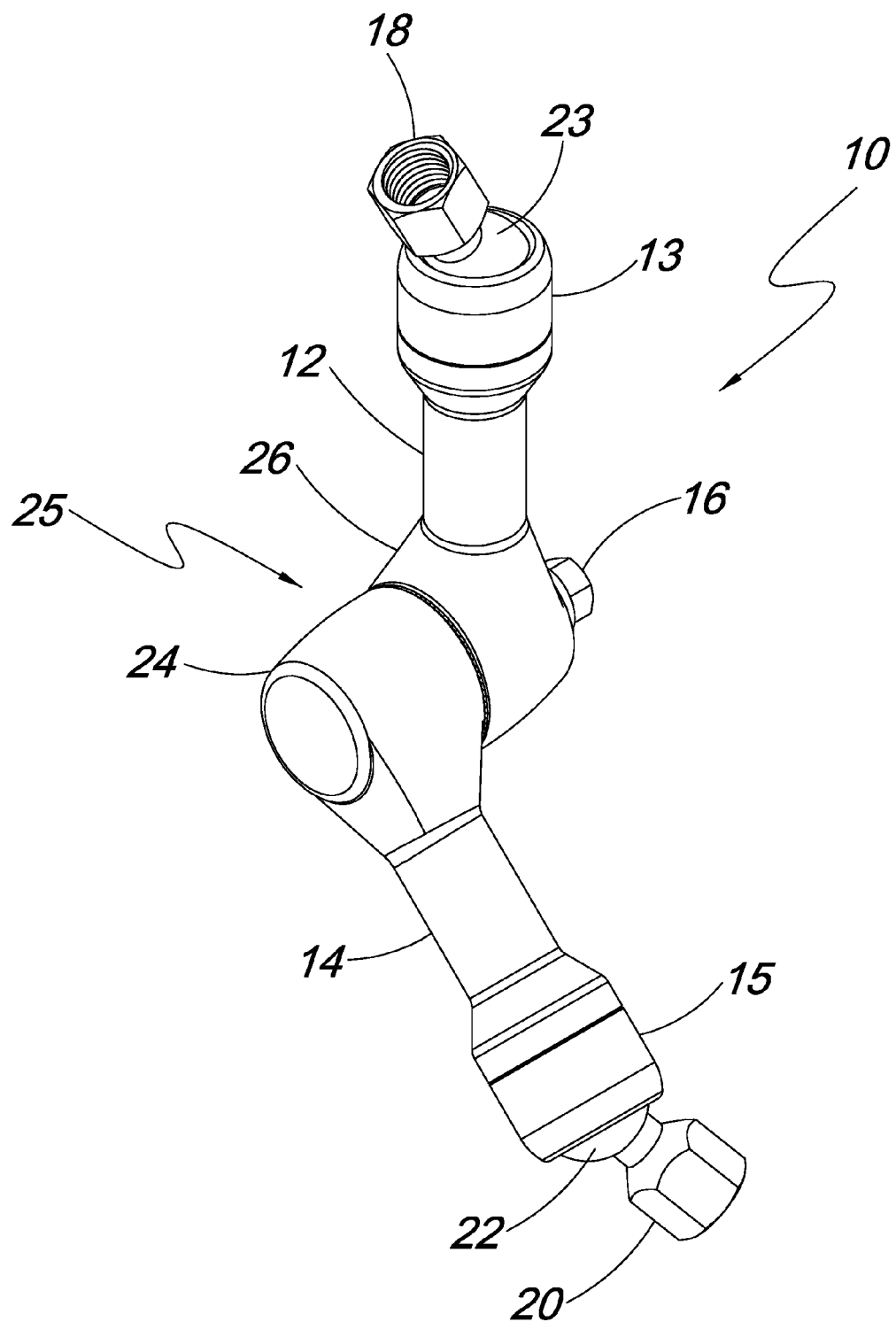
FIG. 2 illustrates an opposite view of the articulated high-pressure conduit device shown in FIG. 1, according to some embodiments of the present invention.

Reference is now made to the figures. FIG. 1 illustrates an articulated high-pressure conduit device 10, according to some embodiments of the present invention. FIG. 2 illustrates another view of the articulated high-pressure conduit shown in FIG. 1, according to some embodiments of the present invention.

Articulated high-pressure conduit device 10 (device 10, for brevity) generally includes two arms 12 and 14 (or more in other embodiments of the present invention). Pivotally connected at their proximal ends by a joint 25, comprising two opposite caps 24 and 26 held together by a locking mechanism (not shown in this figure—see FIG. 3 and FIG. 4). Arms 12 and 14 may be moved so as to define various angles between them, about pivot joint 25.

Figure 3:
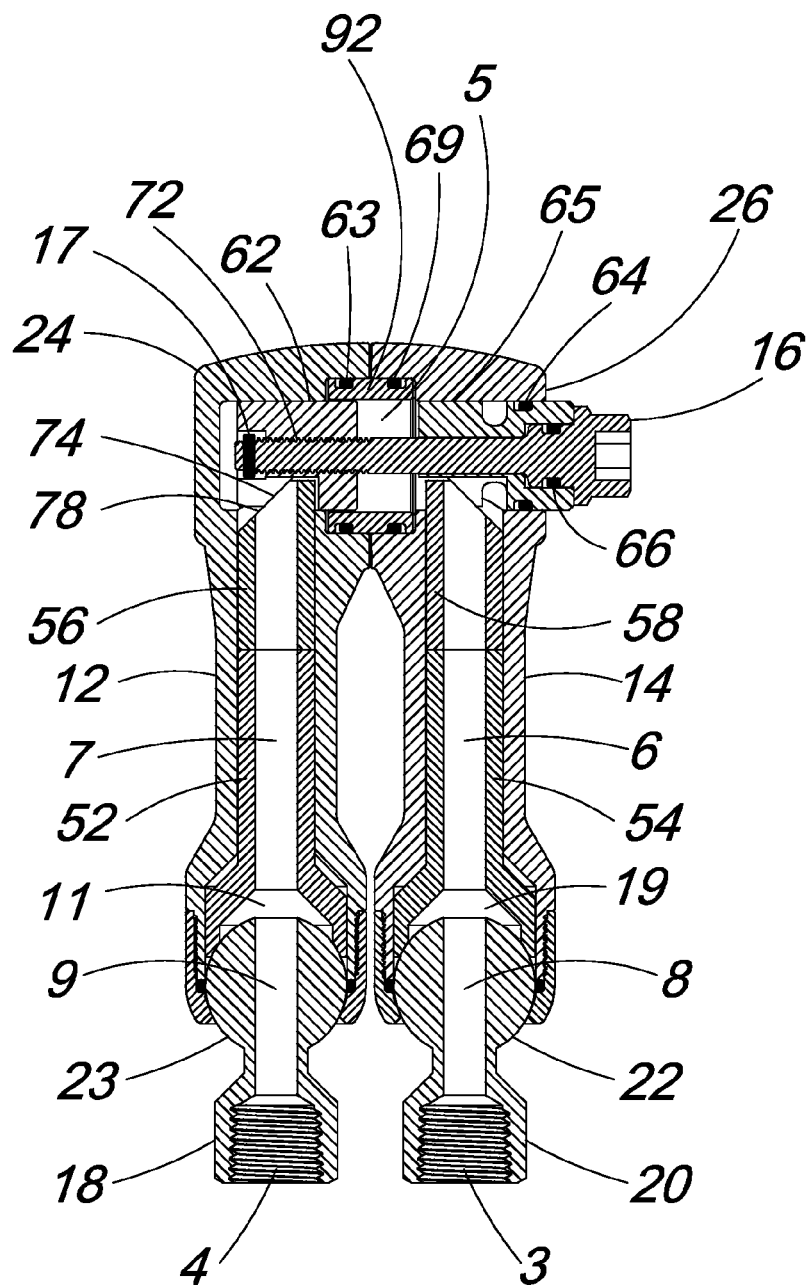
FIG. 3 illustrates a cross-sectional view of the articulated high-pressure conduit device shown in FIG. 1, according to some embodiments of the present invention.
Figure 4:
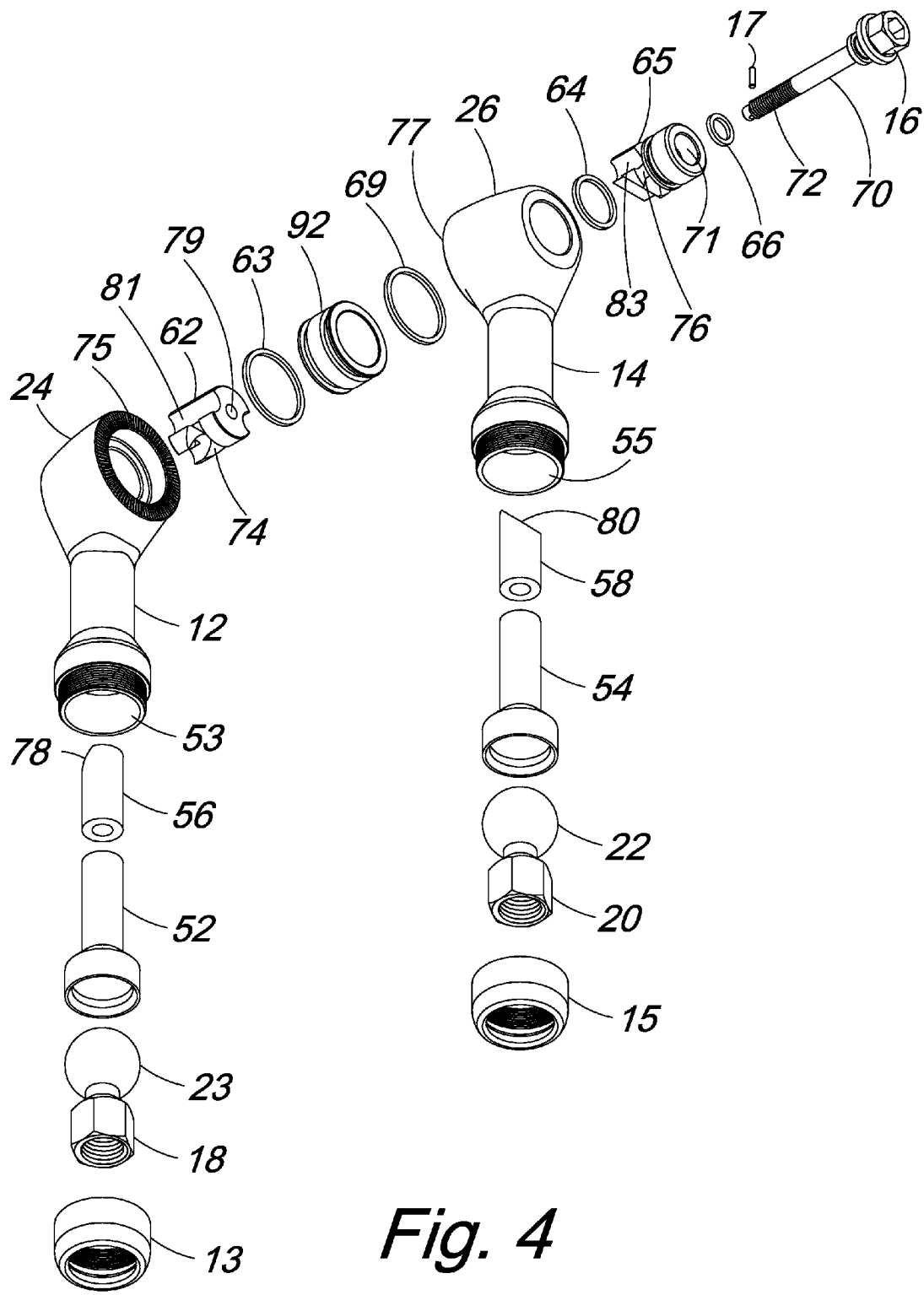
FIG. 4 is an exploded view of the articulated high-pressure conduit device shown in FIG. 1, according to some embodiments of the present invention.

Arm 12 and arm 14 each have, at their distal ends, an adapter (18 and 20 respectively) for connecting to a liquid source (e.g., a high-pressure liquid source) at one end and to a dispenser (e.g., a nozzle) at the other end. The adapters 18 and 20 are designed to be tilted within a predetermined range of angles (defining a conical space) so as to allow proper adjustment. The tilting of each adapter 18, 20 may be achieved, for example, by a spherical member 23, 22, that is configured to be retained at a distal end of each arm 12 and 14, within a receptacle 53 and 55 (respectively) and bound by rings 13 and 15 (respectively), tapered at their edge, as shown in FIG. 3 and FIG. 4. When rings 13 and 15 are fixed over receptacles 53 and 55, respectively, the tapered rim of the rings retains the spherical member of the adapter.

An articulated high-pressure conduit device, according to some embodiments of the present invention, comprises a hollow conduit through which liquid may flow from one end of the device to the other. The rigidity of the device and its endurance to high-pressure may be determined by the use of strong, rigid building materials (at least for the outer parts). For example, the device or some parts of it may be made of hard metal, such as, for example, stainless steel. In particular it may be useful, in the making of the device or some of its parts (e.g., the inner parts), to use premium stainless mould steel designed for small inserts and cores, known to present good corrosion resistance, excellent polishability, good wear resistance, good machinability and good stability in hardening.

Knob 16 is used for operating the locking mechanism, to lock of the articulated high-pressure conduit in a desired position, and unlock it, as desired.

In an unlocked position, arms 12 and 14 are free to move, and a user may arrange them in a user-defined angle, while adapters 18 and 20 may each be tilted to assume a desired tilt.

In a locked position, arms 12 and 14 are fixed in position at a user-defined angle, while adapters 18 and 20 are fixed and cannot be moved or tilted.

The locking mechanism that allows this concurrent locking of the arms and adapters is shown in FIG. 3 and FIG. 4, and is explained in the corresponding parts of the specification hereinafter.

FIG. 3 illustrates a cross-sectional view of the articulated high-pressure conduit shown in FIG. 1, according to some embodiments of the present invention. FIG. 4 is an exploded view of the articulated high-pressure conduit shown in FIG. 1, according to some embodiments of the present invention.

Caps 24 and 26 may be provide, each with a ragged edge, 75 and 77 (respectively) facing each other so that when they are tightened together by operating knob 16, relative rotation is prevented, keeping arms 12 and 14 in the desired orientation and relative deployment. The ragged edge may include, for example, a rough surface, teeth, bumps, grooves, a high friction material (e.g., rubber), a combination thereof and the like.

The locking mechanism includes movable wedges—wedge 62, located within cap 24, to interact with spacers 56 and 52 that are located within arm 12, and wedge 65, located within cap 26, to interact with spacers 58 and 54 that are located within arm 14. The number of spacers within each arm may vary from a single spacer to a plurality of spacers, as it is a matter of manufacturing, design and assembling considerations or preferences. Wedges 62 and 65 each include an inclined surface 74 and 76 respectively, aimed at interacting with a matching inclined surface of spacers 56 and 58 (respectively). Wedges 62 and 65 each include a bore (79 and 71) along their longitudinal axis through which shaft 70 passes. Within one of the bores of the wedges (bore 79 of wedge 62), a thread is provided that matches thread 72 on shaft 70. Pin 17 serves to limit the unscrewing of shaft 70 so as to prevent disintegration of the locking mechanism and consequently of the entire device, when operating knob 16.

The locking mechanism may also include O-rings (63, 64, 66, 69) to provide effective sealing where necessary, and ball bearings 68, to allow smooth relative rotation between caps 24 and 26, when the locking mechanism is slightly released.

In order for the locking mechanism to assume a locked position, knob 16 is operated. Knob 16 is turned in a predetermined direction (e.g., clockwise), causing wedge 62 and wedge 65 to move closer to each other, thereby tightening caps 24 and 26 until joint 25 is locked, keeping arms 12 and 14 at a desired angle between them. Concurrently to the locking of joint 25, adapters 18 and 20 are also locked in their current tilts, due to the force exerted by the inclined surfaces 74 and 76 of wedges 62 and 65 on inclined surfaces 78 and 80 of spacers 56 and 58, that presses the spacers against spheres 23 and 22 of adapters 18 and 20 (respectively).

Turning knob 16 in the opposite direction causes joint 25 and adapters 18 and 20 to be released, so as to allow relative movement between the arms and tilting of the adapters.

The internal parts of articulated conduit device 10 define a continuous cavity through which fluid may flow: adapters 18 and 20 include openings 4 and 3 and bores 9 and 8, contiguously to passages 7 and 6 within spacers 52, 56, 58 and 54, respectively, wherein cavity 5 is defined within joint 25, and wedges 62 and 65 include passages 81 and 83 (respectively)—all continuously connected so as to allow fluid to flow through the device.

In order for fluidic continuity to be maintained throughout the device, spacers 52 and 54 include funnels 11 and 19 respectively, whose broader aspects face bores 9 and 8 of spherical members 23 and 22. The size of the funnels, and in particular their broader aspects, is designed to maintain constant flow through the bores of the spherical members from or to passages 6 and 7, and the entire continuous cavity within the device. The spherical members 22 and 23 are designed to be tilted up to a predetermined angle (limited by the tapered rim of rings 15 and 13), and the broad aspect of funnels 11 and 19 are designed to allow flow when the spherical members are fully tilted.

The locking mechanism of the articulated conduit device, according to some embodiments of the present invention, allows locking and unlocking of the arms and adapters in a single action, by operating the knob that governs the locking mechanism. In a single action of the knob, the arms may be fixed in position and orientation or released, concurrently locking or releasing the adapters. This allows, for example, for a quick positioning and directing of a nozzle that may be coupled to one end of the device (via one of the adapters), when the other end of the device (via the other adapter) is coupled to a fluid supply (e.g., an outlet of a high-pressure coolant reservoir).

An articulated conduit device, according to some embodiments of the present invention, may be designed to operate under high-pressure conditions. In some embodiments of the present invention the device may withstand high-pressures up to 120 atmospheres.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. An articulated conduit device comprising:
   at least two arms pivotally connected at proximal ends of the arms by a joint;
   a tiltable adapter at a distal end of each of the arms, capable of tilting up to a predetermined angle;
   a locking mechanism operable by a single action to concurrently lock or unlock the arms and adapters in a user-defined orientation and direction, each of the adapters including a spherical member, the locking mechanism including movable wedges and spacers, each of the spacers including a passage and a funnel facing a bore within the spherical member designed to allow flow even when the spherical member is fully tilted, each of the wedges designed to exert a force on one or a plurality of the spacers, when in a locked position, so as to prevent the adapters from tilting, when the joint is locked,
   wherein a continuous cavity is defined within the device between external openings in the adapters and through the arms and joint so as to allow fluid to flow between the external openings of the adapters.

2. The device of claim 1, wherein the locking mechanism comprises a knob.

3. The device of claim 1, wherein the wedges include, each, an inclined surface configured to interact with an inclined surface of a spacer of said spacers.

4. The device of claim 3, wherein the wedges include, each, a bore, through which a shaft is inserted.

5. The device of claim 1, configured to withstand pressures ranging up to 120 atmospheres.

6. The device of claim 1, wherein all or some of the device is made of hard metal.

7. The device of claim 6, wherein the metal comprises stainless steel.

8. The device of claim 1, wherein the joint comprises two facing caps, each cap coupled to one of the arms.

9. The device of claim 8, wherein the caps comprise a ragged edge, the ragged edges facing each other.

10. An articulated conduit device comprising:
    at least two arms pivotally connected at proximal ends of the arms by a joint;
    a tiltable adapter at a distal end of each of the arms, capable of tilting up to a predetermined angle;
    a locking mechanism operable by a single action to concurrently lock or unlock the arms and adapters in a user-defined orientation and direction, the locking mechanism including movable wedges and spacers, each of the wedges designed to exert a force on one or a plurality of the spacers, when in a locked position, so as to prevent the adapters from tilting, when the joint is locked, each of the wedges including an inclined surface configured to interact with an inclined surface of a spacer of said spacers and a bore through which a shaft is inserted,
    wherein one of the bores includes an internal thread configured to match a thread on the shaft, and wherein a continuous cavity is defined within the device between external openings in the adapters and through the arms and joint so as to allow fluid to flow between the external openings of the adapters.

* * * * *